W. CHURCHILL.
LENS AND MIRROR MOUNTING.
APPLICATION FILED DEC. 4, 1913.

1,102,138.

Patented June 30, 1914.

Witnesses

Inventor
William Churchill,
By
Attorneys

UNITED STATES PATENT OFFICE.

WILLIAM CHURCHILL, OF CORNING, NEW YORK.

LENS AND MIRROR MOUNTING.

1,102,138.  Specification of Letters Patent.  Patented June 30, 1914.

Application filed December 4, 1913. Serial No. 804,687.

*To all whom it may concern:*

Be it known that I, WILLIAM CHURCHILL, a citizen of the United States, residing at Corning, in the county of Steuben and State of New York, have invented new and useful Improvements in Lens and Mirror Mountings, of which the following is a specification.

My invention relates to improvements in lens and mirror mountings for use in the art of signaling, more especially as applied to railroad practice.

In my application Serial No. 697,327, filed May 14, 1912, I show a device especially adapted for use in connection with a railway signal semaphore or similar signaling apparatus having, as a part thereof, a movable blade or target. The invention therein shown involves the reflection of light and the production of the signaling effect by the use of a movable signaling part upon which are supported a casing, a corrugated lens and a reflector, said parts so supported constituting a unitary signaling member adapted to be so arranged that beams of substantially parallel rays—as from a locomotive headlight—in a direction toward said unitary signaling member and impinging on the surface of the lens thereof, are brought to focus on or adjacent to the surface of the reflector thereof, and then by reflection are caused to travel backward through said lens in the direction of the source of illustration, there to be seen by an observer located at or adjacent to such source. My invention now to be described is intended to improve and render more efficient the unitary signaling member set forth in said application.

Figure 1:
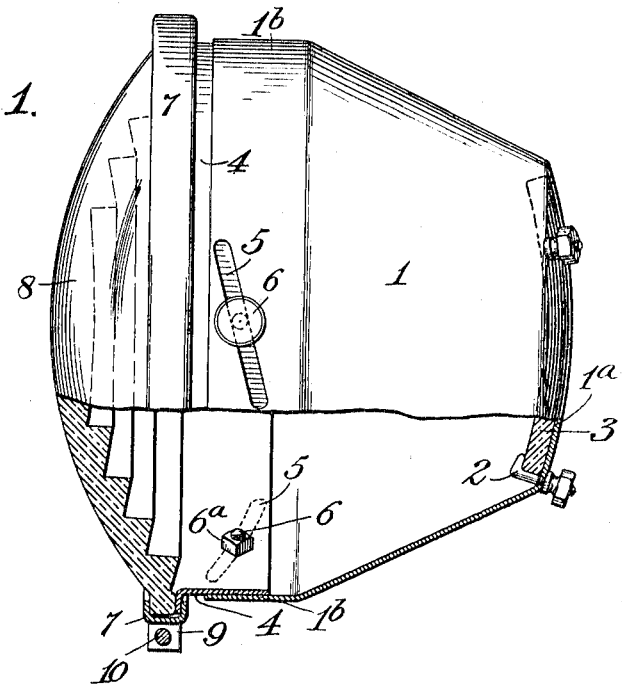
Figure 2:
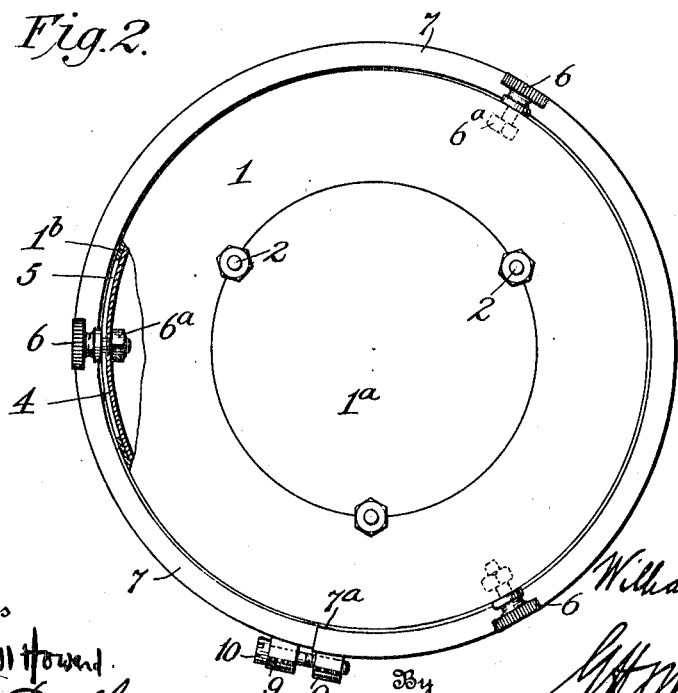

In the accompanying drawing, Figure 1 is a side view partly in section of the said unitary signaling member. Fig. 2 is a rear view thereof.

In order to get reflected beams of maximum intensity from the unitary signaling member, one or a series of which may be inserted in a semaphore blade or similar movable blade or target, it is necessary to produce an accurate adjustment between the lens and the mirror. If the adjustment is inaccurate, the reflected beams will be diffused, and hence of low intensity. In ordinary commercial lenses and mirrors, such as would usually be employed in practice, there is liable to be a slight amount of variation of curvature and consequently of focal length. Furthermore, I have found it impossible to secure sufficient accuracy by using a rigid frame or casing in which both the lens and the reflector have been inserted by a mechanic at a prescribed distance. In order to get accurate adjustment it has been found necessary to construct the frame or casing in such a way that the distance between the lens and the reflector may be altered within certain limits. Variation in adjustment of ⅜ of an inch should be sufficient in all cases, and with such variation it is possible and desirable to carefully test the lens and mirror combination before placing it in service, and to give the combination the precise adjustment capable of producing the maximum results.

With this preliminary explanation of the invention, reference is now made to the drawing, in which 1 is a casing preferably of substantially frusto-conical form and adapted to be fitted to a semaphore arm, or similar movable blade or target, or to any other support, whether movable or stationary. This casing is preferably made of sheet metal, its smaller end being closed as shown at 1ª. Within this end of the casing is appropriately secured, as by hooked bolts 2, a mirror 3. The larger end 1ᵇ of the casing which is of cylindrical form receives a flanged sleeve 4 adapted to have rotative movement. The cylindrical part 1ᵇ is provided with a series of angular slots 5, as here shown three in number, and through these slots pass screw bolts 6 having nuts 6ª, by means of which bolts the sleeve 4, when it has been given the necessary adjustment with respect to the axis of the casing, may be permanently secured. Over the outer or flanged end of the sleeve 4 is slipped a divided ring 7, within which the outer edge of the corrugated lens 8 is fitted. The split ring is adapted to telescope at its meeting ends, as at 7ª, to each of which is attached a clip or lug 9. Through these lugs passes a bolt 10 which may be threaded as shown in Fig. 2 in one of the lugs 9, or if preferred a nut may be used upon the said end of the bolt. By such means the lens after it has been inserted within the divided ring 7 may be secured therein, and also readily released.

In operation, the casing 1 with its adjuncts when placed in the required position, and it is desired to adjust the lens to the required distance, this may be done by the rotation of the sleeve 4, and when it is brought in place it may be tightened by means of the bolts 6. The mounting is practically dust-tight if the lens is secured properly in position. By the means described it is possible to vary the distance between the lens and the reflector within the required limits while the axes of both preserve their proper relation to each other, that is to say, the axis of the mirror and the axis of the lens both fall on the same straight line. The adjustment having been once made the lens and mirror cannot become displaced. If it becomes necessary to replace a lens or a mirror, or both, it is a comparatively simple matter to adjust the mounting to take care of any slight variation in lens or mirror as compared with those previously used.

A simple method of testing the optical combinations is to set them up at a distance of about fifty feet from a source of approximately parallel rays, such as an ordinary corrugated lens, with a lamp behind it, and to then fasten a small piece of mirror to the front face of the lens at such an angle that the image of the lens-reflector combination projected back and striking it is deflected to one side. An observer stations himself so that he can observe the image of the combination deflected from the mirror. The distance between the lens and the mirror in the mounting is now varied until it is noted by the observer that the entire lens appears to be illuminated. When this effect is noticed it is obvious that the adjustment is correct, as it is made permanent in the manner hereinbefore described. If for any reason it is desired to produce a divergent beam from the lens-reflector combination, instead of a narrow beam of approximately parallel rays, it is feasible to set the combination by trial, as described, at exactly the distance needed in order to produce any required amount of spread.

While I have described my improved lens and mirror mounting in the form and having the means of adjustment found to be practicable and preferred by me, it is obvious that my invention is capable of variation in form having structural and operative features which may suggest themselves to the skilful mechanic, without departing from what is herein claimed.

Having thus described my invention, I claim:—

1. A unitary signaling member for receiving light from a source exterior to said member and reflecting back the light toward such source, the same consisting in a casing having a cylindrical front portion, a mirror fixedly placed at the rear of said casing and closing the same, a sleeve fitted to and adapted to have rotative movement with respect to the cylindrical front portion of said casing, a lens carried by the sleeve, and means associated with the cylindrical part of the casing and said sleeve whereby, on such rotative movement of the latter, the lens may be axially adjusted and the distance between it and the mirror varied, substantially as set forth.

2. A unitary signaling member for receiving light from a source exterior to said member and reflecting back the light toward such source, the same consisting in a casing having a cylindrical front portion, the latter being provided with angular slots, a mirror fixedly placed at the rear of said casing and closing the same, a sleeve fitted to and adapted to have rotative movement with respect to the cylindrical front portion of said casing, a lens carried by the sleeve, and screw bolts passing through said slots and the cylindrical front portion of said casing, the arrangement being such that on the loosening of said screw bolts rotative movement of said sleeve with respect to said cylindrical part of the casing is permitted, the lens axially adjusted, and the distance between it and the mirror varied, substantially as set forth.

3. A unitary signaling member for receiving light from a source exterior to said member and reflecting back the light toward such source, the same consisting in a casing having a cylindrical front portion, a mirror fixedly placed at the rear of said casing and closing the same, a sleeve fitted to and adapted to have rotative movement with respect to the cylindrical front portion of said casing, a divided ring carried by said sleeve, a lens supported by said divided ring, means for clamping the lens within the divided ring, and means associated with the cylindrical part of the casing and said sleeve whereby, on such rotative movement of the latter, the lens may be axially adjusted and the distance between it and the mirror varied, substantially as set forth.

In testimony whereof I affix my signature in presence of two witnesses.

WILLIAM CHURCHILL.

Witnesses:
EMILIO PASCUCCI,
HENRY PHELPS GAGE.